US009214069B2

(12) United States Patent
Rucker et al.

(10) Patent No.: US 9,214,069 B2
(45) Date of Patent: Dec. 15, 2015

(54) GAMING MACHINE AND METHOD OF PROVIDING AN ELECTRONIC GAME

(75) Inventors: Keith Rucker, Las Vegas, NV (US); Jason Gilmore, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 148 days.

(21) Appl. No.: 13/323,603

(22) Filed: Dec. 12, 2011

(65) Prior Publication Data

US 2013/0029749 A1 Jan. 31, 2013

(30) Foreign Application Priority Data

Jul. 25, 2011 (AU) ................................ 2011204958

(51) Int. Cl.
*A63F 13/00* (2014.01)
*G07F 17/32* (2006.01)

(52) U.S. Cl.
CPC .................................. *G07F 17/3267* (2013.01)

(58) Field of Classification Search
CPC ............ G07F 17/3267; G07F 17/3213; G07F 17/3211; G07F 17/3269
USPC .......................................... 463/16, 20, 40–42
See application file for complete search history.

(56) References Cited

U.S. PATENT DOCUMENTS

| | | | | |
|---|---|---|---|---|
| 6,652,378 | B2 | 11/2003 | Cannon et al. | |
| 8,388,435 | B2 * | 3/2013 | Anderson et al. | 463/20 |
| 2007/0072665 | A1 * | 3/2007 | Muir | 463/12 |
| 2008/0102916 | A1 * | 5/2008 | Kovacs et al. | 463/16 |

OTHER PUBLICATIONS

Examiner's First Report dated Oct. 17, 2011.

* cited by examiner

*Primary Examiner* — Ronald Laneau
*Assistant Examiner* — Ross Williams
(74) *Attorney, Agent, or Firm* — Howard & Howard Attorneys PLLC

(57) ABSTRACT

A gaming machine and method are provided which provide a plurality of games on a display device to a player. The outcome of the games are randomly selected and displayed on the display device. For each game: if the outcome is a winning outcome an award is awarded to the player as a function of the outcome, the wager made by the player, and a predetermined paytable and if a triggering condition in the outcome of each game, an other award is responsively awarded to the player if the triggering condition is detected in at least two of the plurality of games.

37 Claims, 4 Drawing Sheets

GAMING MACHINE AND METHOD OF PROVIDING AN ELECTRONIC GAME

CROSS-REFERENCE TO RELATED APPLICATIONS

This application claims the benefit of Australian Patent Application No. 2011204958 which was filed Jul. 25, 2011, the disclosure of which is incorporated herein by reference.

FIELD OF THE INVENTION

The present invention relates generally to video gaming machines and more particularly, to an apparatus and method for simultaneously playing a plurality of games on a video gaming machine and providing a bonus award as a function of the outcome of the plurality of games.

BACKGROUND OF THE INVENTION

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability.

The present invention is directed to satisfying these needs.

SUMMARY OF THE INVENTION

In a first aspect of the present invention, a method of allowing a player to play a gaming machine is provided. The method includes the steps of allowing the player to make a wager, simultaneously displaying a plurality of games on a unitary display device, and randomly selecting an outcome associated with each game and simultaneously displaying the outcome of each game on the unitary display device. For each game, the method includes the steps of determining if the outcome is a winning outcome and responsively awarding an award to the player as a function of the outcome, the wager made by the player, and a predetermined paytable. The method further includes the steps of detecting a triggering condition in the outcome of each game, and responsively awarding the player a third award if the triggering condition is detected in at least two of the plurality of games.

In a second aspect of the present invention, a gaming machine playable by a player is provided. The gaming machine includes a unitary display device and a game controller. The a game controller allowing the player to make a wager and simultaneously displays a plurality of games on a unitary display device, randomly selecting an outcome associated with each game and simultaneously displaying the outcome of each game on the unitary display device. The game controller, for each game, determines if the outcome is a winning outcome and responsively awards an award to the player as a function of the outcome, the wager made by the player, and a predetermined paytable. The game controller further detects a triggering condition in the outcome of each game, and responsively awards the player a third award if the triggering condition is detected in at least two of the plurality of games.

In a third aspect of the present invention, a method of allowing a player to play a gaming machine is provided. The method includes the steps of allowing the player to make a wager, simultaneously displaying a plurality of games on a unitary display device, and randomly selecting an outcome associated with each game and simultaneously displaying the outcome of each game on the unitary display device. For each game, the method includes the steps of determining if the outcome is a winning outcome and responsively awarding an award to the player as a function of the outcome, the wager made by the player, and a predetermined paytable. The method further includes the steps of detecting a triggering condition in the outcome of each game, and responsively awarding the player a third award if the triggering condition is detected in games meeting a predetermined pattern within the predetermined arrangement.

In a fourth aspect of the present invention, a gaming machine playable by a player is provided. The gaming machine includes a unitary display device and a game controller. The game controller allowing the player to make a wager and simultaneously displays a plurality of games on a unitary display device, randomly selecting an outcome associated with each game and simultaneously displaying the outcome of each game on the unitary display device. The game controller, for each game, determines if the outcome is a winning outcome and responsively awards an award to the player as a function of the outcome, the wager made by the player, and a predetermined paytable. The game controller further detects a triggering condition in the outcome of each game, and responsively awards the player a third award if the triggering condition is detected in games meeting a predetermined pattern within the predetermined arrangement.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

With reference to the drawings and in operation, the present invention provides a gaming machine 10 which provides a plurality of games simultaneously displayed on a unitary display device 14.

The gaming machines 10 displays and plays at least two games simultaneously. In the illustrated embodiment, the at least two games are slot games. However, it should be noted that the at least two games could be any type of electronic game on which a wager may be made.

The gaming machine 10 may provide a plurality of slot games. The slot games may be video slot games or a stepper motor slot games. For the purposes of illustration and example only and without limitation, the present invention will be described with respect to video slot games.

In general, the gaming machine 10 displays, and allows a player to simultaneous play a plurality of video slot game which are displayed and played simultaneously. In one embodiment, the player makes a single wager. The single wager may be based on the number of games played. For example, in one embodiment, the player is given the opportunity to choose how many games are played simultaneously. Each game may have an associated wager. The wagers from the number of games the player chooses are added together to form a single wager. In one embodiment, the wager associated with each game may vary based on, for example, the number of paylines played on a particular game.

Figure 1:
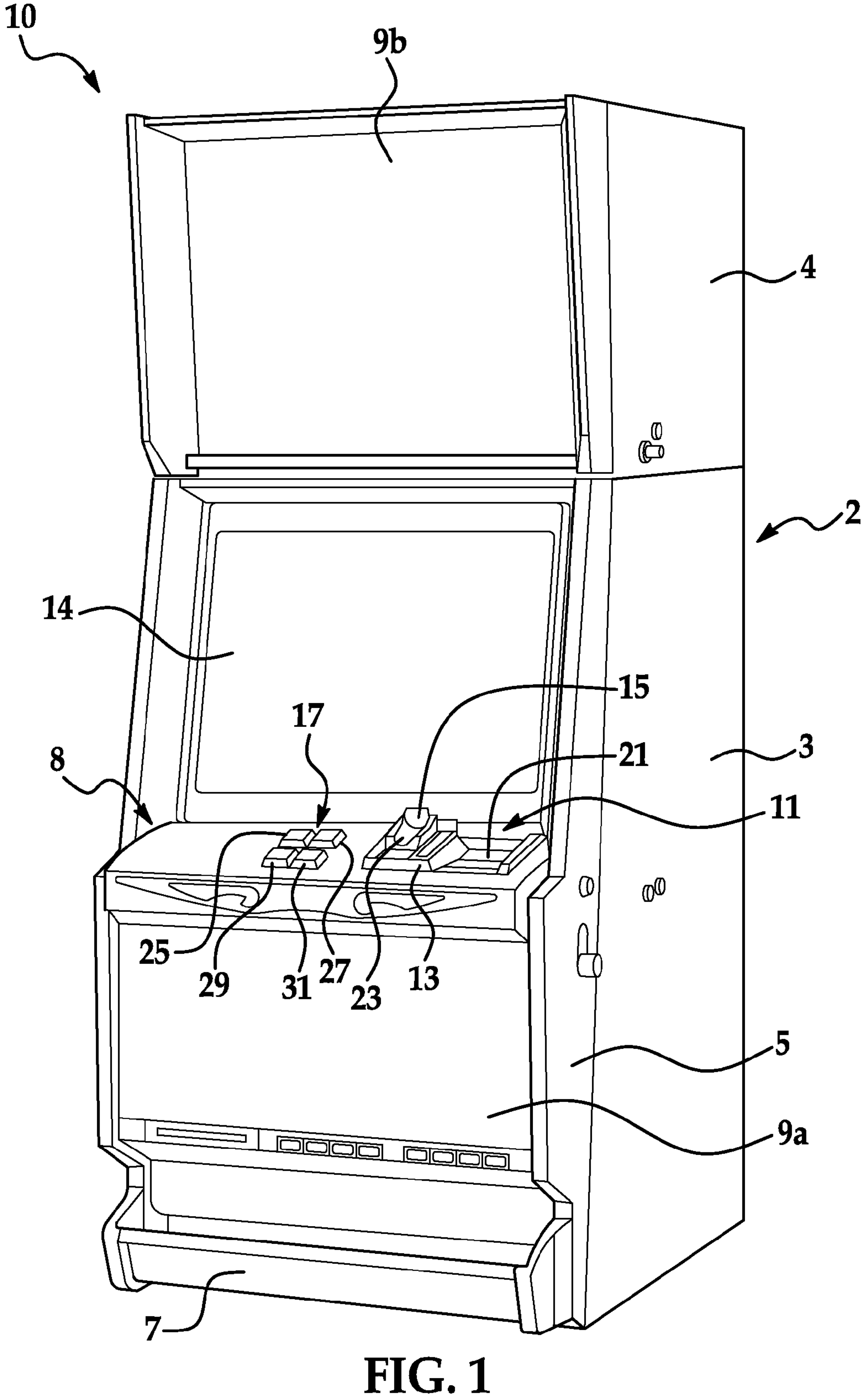
FIG. 1 is a perspective view of a gaming machine.

With specific reference to FIG. 1, an exemplary gaming machine 10 is illustrated into which the present invention can be incorporated to improve the enjoyment of a video game and to thereby increase the amount of time that the video game is played by patrons of a gaming establishment. FIG. 1 shows a general appearance of the gaming machine 10 to which the present invention is applied. As shown in the FIG. 1, the machine 10 comprises a housing 2 standing upright. The housing 2 comprises a main body 3, a top box 4 mounted on a top portion of the main body 3 and a door 5 attached to a front side of the main body 3 so as to be swingable between an open position and a close position.

At a center portion of the front side of the main body 3, there is mounted the unitary main display device or display 14 comprising a CRT, LCD, LED, or other type of device, and below the display 14 is provided an operation panel 8. The operation panel 8 is attached to the door 5 so as to slope down in a forward direction of the machine 10. Below the operation panel 8 and on a front side of the top box 4, there are provided decoration panels 9*a* and 9*b* on which pictures, letters and the like representing a title of the machine 10 or the like are illustrated.

As shown in FIG. 1, the operation panel 8 is provided, from a right end toward a left end thereof, with an insertion portion 11, and an input portion 17. The insertion portion 11 is provided with a slot base 13 integrally formed with a coin insertion portion 15 and a bill insertion portion 21.

The input portion 17 is provided with four push button switches 25, 27, 29, 31 as first input devices, each of which is capable of being depressed. These push button switches 25, 27, 29, 31 are selected as switches to be operated with particular high frequency during the game, so that these switches are provided on the operation panel 8. For example, the push button switch 29 at a lower left position of the four switches is operated for starting the game. The number of the push buttons provided at the input portion 17 and functions assigned to the push buttons can be properly changed.

Figure 2:
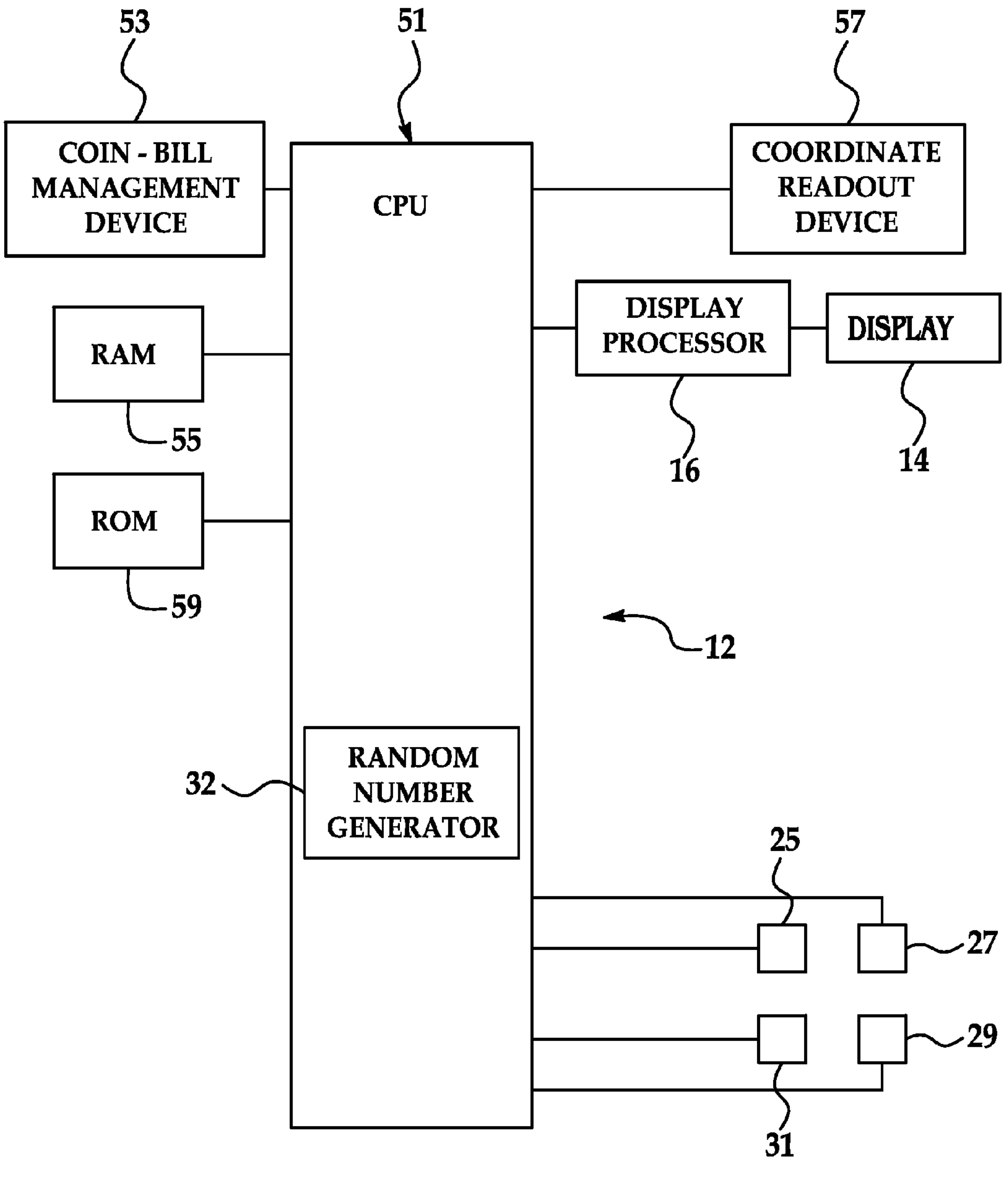
FIG. 2 is a schematic representation of the video gaming machine of the present invention; and, FIG. 3 is an exemplary screenshot of a video slot game, according to a first embodiment of the present invention.

Referring now to FIG. 2, a block diagram illustrating a schematic configuration of a control system provided in the machine 10 is depicted, according to one embodiment of the present invention. The machine 10 includes a game controller 12. The game controller 12 includes a central processing unit (CPU) 51, a coin-bill management device 53, a display processor 16, RAM 55 as a memory device and EPROM 59. The CPU 51 is mainly composed of a microprocessor unit and performs various calculations and motion control necessary for the progress of the game.

The coin-bill management device 53 detects the insertion of a coin and a bill from the coin insertion portion 15 and the bill insertion portion 21, and performs a necessary process for managing coins and bills. The display processor 16 interprets commands issued from the CPU 51 and displays desirable images on the display 14. The RAM 55 temporary stores programs and data necessary for the progress of the game, and the EPROM 59 stores, in advance, programs and data for controlling basic operation of the machine 10, such as the booting operation thereof.

The gaming machine 10 of FIG. 1 further includes the unitary display 14 that displays a plurality of games and a player using the gaming machine 10 interacts with the games.

The CPU 51 is electrically connected to a coordinate readout device 57 as well as the above mentioned pushbutton switches 25, 27, 29, 31. The coordinate readout device 57 works as a second input device and comprises, for example, a so-called touch panel formed as a transparent panel on the display 14 and capable of issuing signals corresponding to the coordinates of a position touched on the display 14 by the player. The coordinate readout device 57 is closely put on the surface of the display 14 and integrated therewith. A random number generator 32 is included for randomly generating numbers during play of the game, as described below.

Figure 3:
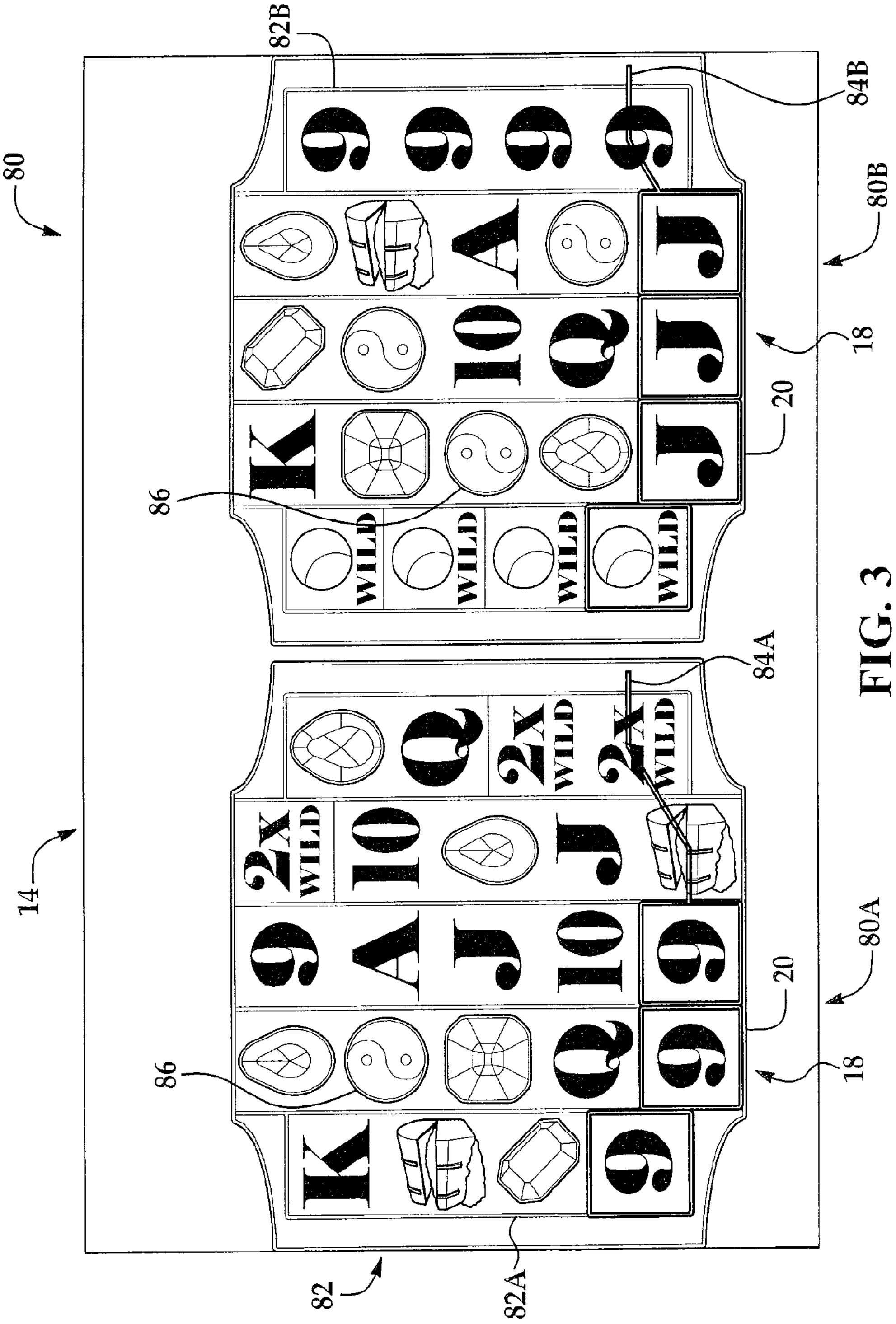

With reference to FIGS. 1 and 3, the game controller 51 sends a signal to a display processor 16 for displaying a plurality of game elements 18 on the display 14.

The display may include a touchscreen device (not shown) for implementing portions of a user interface. For example, a cash-out button (not shown) may be provided such that when the cash-out button is activated any accumulated credits are paid to the player in a coin bin 7. A winner paid meter (not shown) keeps track of credits paid out to a player. The touchscreen buttons may also be implemented as physical buttons affixed to the machine 10 in a conventional manner.

The unitary display 14 may further include a help touchpad (not shown) for accessing information about the game. A credit meter (not shown) displays to the player a number of credits available to the player for game play or cash-out. A select lines touchpad (not shown) allows the player to toggle through and select the available sets of paylines. Preferably, the video slot gaming machine 10 is a multi-line game, i.e., the paylines include horizontal paylines and/or diagonal paylines, and/or zig-zag paylines. A bet per line touchpad or button (not shown) may allow the player to toggle to increase the bet per line a credit at a time (up to the maximum bet).

Returning to FIG. 2, the game controller 12 awards an award in response to the outcome of the at least two games displayed on the unitary display 14. In general, the term “award” may be a payout, in terms of credits or money. Thus, the game controller may award a regular payout in response to the outcome of the at least two games. However, it should be noted that the term award may also refer to other types of awards, including, prizes, e.g., meals, show tickets, etc . . . , as well as in-game award, such as free games or awarding the player one or more wild symbols or stacked wild symbols in each of the games.

With reference to FIG. 3, in one aspect of the present invention, the game controller 12, the unitary display device or display 14 is adapted to display the at least two games simultaneously, such that both games, as well as the play of both games are viewable at the same time. In this sense, simultaneous means that the games are viewable at the same time, however, it does not mean that the games and/or reels start and/or start at the same time. In another aspect of the present invention the at least two games start and/or stop at the same time.

It should be noted that the above described gaming machine 12 is for exemplary purposes only. The present invention is not limited to any particular gaming machine and/or game. The gaming machine 12 may also include other features. For example, the gaming machine 12 may include a player tracking device (not shown) which is connected to a player tracking system. The gaming machine 12 may also utilize a cashless wagering system (not shown), such as a ticket in ticket out (TITO) system (not shown).

With particular reference to FIGS. 3-7, the game controller 12 displays a plurality of games 80 on the display 14. With particular reference in FIG. 3 in one embodiment, the plurality of games 80 includes first and second games 80A, 80B. In the illustrated, the games 80 are video slot games. However, it should be noted that the games 80 could be any type of game upon which a player could make a wager.

For example, in the case where the games are video slot games, each game 80 includes a plurality of elements 18 in a grid 20 having a plurality of cells defined by rows and/or columns. During play of the video slot game, the game controller 12 randomly selects the game elements 18 to be displayed in the display device 14. The selected game elements 18 are selected from a set of possible game elements. The game controller 12 is adapted to determine an outcome of each of the game based on the displayed game elements 18, the pay-table, a wager, and predetermined paylines.

Each video slot game 80 is generally first played in a conventional manner. The player makes a wager, which may be based on a predetermined denomination and a selected number of paylines. The reels are spun and game symbols or elements are randomly chosen for each cell. If a predetermined pattern of elements are randomly chosen for each cell on a played payline, the player is awarded a payout based on the payline, the wager, and a predetermined paytable. Many variations to the above described general play of a video slot game fall within the scope of the present invention. Additionally, although the illustrated example (described below), has 5 columns or reels with 4, 5, 5, 5, and 4 cells per reel, respectively (a "4-5-5-5-4" arrangement), other arrangements may be used, such as 3-4-3-4-3, or 4-5-4-5-4 configurations or configurations with the same number of cells per column, such as 3×3, 3×4, 4×5, or 5×5 configurations. Such video slot games are well-known in the art, and are therefore not further discussed.

In general, a single wager is placed by the player. However, the wager may be based on the number of games simultaneously played. In one aspect, the player chooses how many games to be played simultaneously, e.g., 2, 3, or 4 games. There may a portion of the wager associated with each game. Thus, the total wager may be based on the portion of the wager associated with each game, multiplied by the number of games being played.

Once the player makes the wager and initiates the games, generally by actuating a "spin" or "play" button, the games are run and the outcome simultaneously displayed. Once the outcome, the outcome of each of the games 80 is compared with the paytable of the respective game and an award may be awarded to the player if the outcome is a winning outcome. It should be noted that the paytable for the games 80A, 80B may be the same or different.

After the outcomes of the games 80 are determined, the game controller determines if a triggering condition has occurred in the outcome of each game 80. If the triggering condition is detected in at least two of the games 80 then an additional or bonus award may be made to the player.

For example, in the embodiment of FIG. 3 in which a first game 80A and a second game 80B are displayed on the unitary display 14, the outcome of an instance of the games 80A, 80B is shown. In the illustrated instance, the outcome of each game is a winning outcome (as indicated by the highlighted paylines 84A, 84B.

Since there are only two games 80A, 80B are displayed, the triggering condition must occur in both outcomes for the bonus award to be awarded.

In one embodiment, the triggering condition is winning outcome condition. For example, in FIG. 3, since each game 80A, 80B has a winning condition, then the bonus award would be awarded in addition to the award for each winning condition.

Alternatively, the triggering condition could be a losing outcome. Thus, the bonus award would be awarded if both outcomes in the games 80A, 80B were losing conditions. Alternatively, a first bonus award could be awarded if both outcomes were winning outcomes, and a second bonus award could be awarded if both outcomes were losing outcomes. The latter award would generally be less than the first bonus award, i.e., a "consolation" prize.

In one aspect of the present invention, the triggering condition is independent of a winning outcome in each game. For example, in one embodiment the triggering condition is the appearance of a predetermined triggering symbol or element 18 in the outcome of the game 80. For example in the illustrated embodiment of FIG. 3, the triggering symbol could be the yin-yang symbol, or some other symbol, 86. If the triggering symbol 86 appears in the outcome of each game 80A, 80B then the bonus award is awarded to the player.

In a first further embodiment, the value of the award may be a function of the number of trigger symbols in the outcome of both games 80A, 80B.

Alternatively, the triggering symbol 86 must occur in the same cell, i.e., matching cells.

In a still further embodiment the triggering symbol 86 must appear in the same column in one of the games 80 as the triggering symbol 86 in the other game 80, i.e., matching columns.

In a first embodiment of the present invention, the third award has a fixed value, e.g., 5 credits, which may be predetermined or randomly determined.

In second embodiment of the present invention, the third award is a multiplier applied to the first and second awards, e.g., a 2×, or 3× multiplier.

In a third embodiment, the third award is a progressive award. A progressive award is an award which provided from a pool. Generally, a portion of each wager may be allocated to the pool. Thus, the pool will grow based on each wager. In one aspect, the progressive is a stand-alone progressive. In other words, only wagers from one gaming machine 10 contribute to the pool. In another embodiment, contributions from multiple gaming machines 10 and potentially, across gaming properties, may contribute to the progressive pool. The progressive award may be a set amount or variable amount from the pool. Progressive awards are well-known in the art, and therefore, not further discussed.

In another aspect of the present invention, the value of the progressive award may be a function of the number of trigger symbols appearing in a matching column (see above). For example, the value of the progressive award may be provided as in the following chart:

| Game 1 | Game 2 | Matching Reels | Progressive Value |
|---|---|---|---|
| 1 | 1 | Yes | Lowest |
| 2 | 2 | No | \| |
| 2 | 2 | Yes | \| |
| 3 | 3 | No | \| |
| 3 | 3 | Yes | \| |
| 4 | 4 | No | \| |
| 4 | 4 | Yes | V |
| 5 | 5 | N/A | Highest |

The first and second columns represent the number of triggering symbols in each outcome. The third column indicates whether the triggering symbols appear on matching symbols. The fourth column indicates that the progressive value of the award awarded to the player increases as the number of triggering symbols on matching reels increases.

Figure 4:
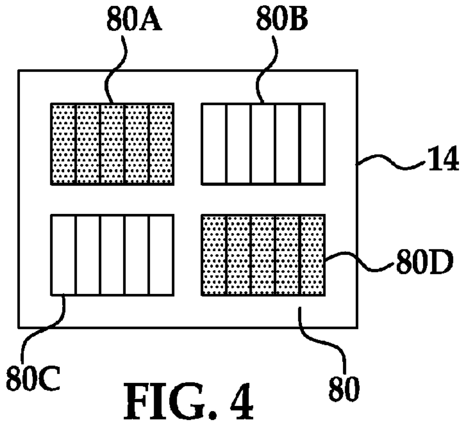
FIG. 4 is an exemplary screenshot of a video slot game, according to a second embodiment of the present invention.
Figure 5:
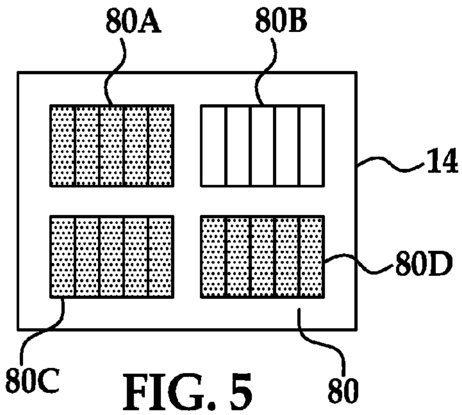
FIG. 5 is an exemplary screenshot of a video slot game, according to a third embodiment of the present invention.
Figure 6:
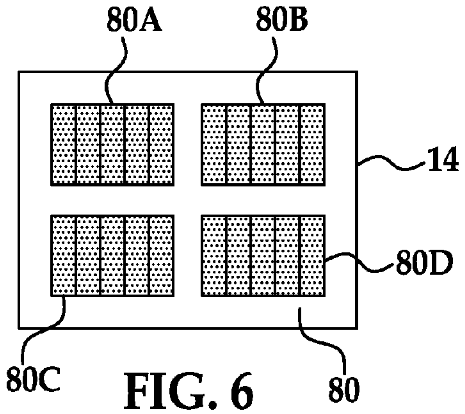
FIG. 6 is an exemplary screenshot of a video slot game, according to a fourth embodiment of the present invention; and, FIG. 7 is an exemplary screenshot of a video slot game, according to a fifth embodiment of the present invention.

With respect to FIGS. 4, 5, and 6, in another embodiment of the present invention, first, second, third and four games 80A, 80B, 80C, 80D may be simultaneously displayed on the unitary display 14.

A first bonus award may be provided if the triggering condition occurs in the outcome of two of the games 80A, 80D (as indicated by the shading in FIG. 4). A second bonus award may be provided if the triggering condition occurs in the outcome of three of the games 80A, 80C, 80D (as indicated by the shading in FIG. 5). A third bonus award may be provided if the triggering condition occurs in the outcome of four of the games 80A, 80B, 80C, 80D (as indicated by the shading in FIG. 6).

In another aspect of the present invention, a method allows a player to play a gaming machine. In a first step, the player is allowed to make a wager. In a second step a plurality of games is displayed in the single unitary display device 14. An outcome associated with each game is randomly determined and the outcome of each game is simultaneously on the unitary display device. For each game, if the outcome is a winning outcome, then an award may be awarded to the player as a function of the outcome, the wager made by the player, and a predetermined paytable. Then, if a triggering condition is detected in the outcome of each game, a third award is responsively awarded to the player if the triggering condition is detected in at least two of the plurality of games. It should be noted that the steps above could be performed in any order, unless dependent upon another step. For example, the award of any awards could be performed last.

Figure 7:
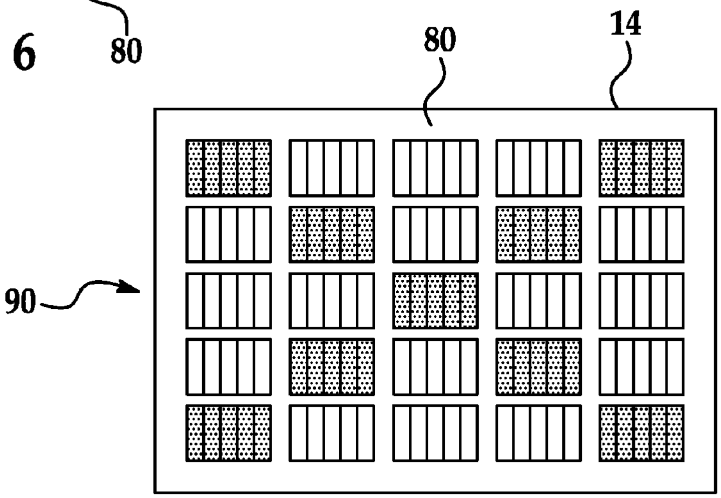

In an other embodiment as shown in FIG. 7, the plurality of games 80 are arranged in a predetermined arrangement 90, such as a grid. In the illustrated embodiment, there are 25 games arranged in a 5×5 grid. However, it should be noted that any number of games 80 may be used, and predetermined arrangements of different sizes and shapes may be used. In this embodiment, the bonus award is awarded to the player if the triggering condition occurs in the outcome of games arranged in a predetermined pattern. For example, in one embodiment, the predetermined pattern is an X shape (as indicated by the shaded games in FIG. 7). Thus, if the triggering condition occurs within the outcome of the games making up this pattern, the bonus award is awarded to the player.

There may be multiple predetermined patterns with a bonus award having the same or different values.

Alternative Embodiment

In an alternative embodiment of the present invention, the present invention provides a plurality of gaming machines 10. Each gaming machine 10 provides one or a plurality of games simultaneously displayed on a display device 14. One of the gaming machines may be designated as a progressive controller 10. Alternatively, the progressive controller 10 may be a separate machine or computer or may be implemented via a computer or server coupled to the gaming machines 10. The games provided by the gaming machines 10 of the alternative embodiment operate in a similar manner as the games provided by the gaming machine 10 in the above embodiment. In other words, the games operate in a conventional manner. A player (at each active gaming machine) makes a wager. If the game(s) are slot games, the reels of each active game is spun and games symbols or elements are randomly chosen for each cell. If a predetermined pattern of elements are randomly chosen for each cell on a played payline, the player(s) are awarded a payout based on the payline, the respective player's wagers, and a predetermined paytable.

In the alternative embodiment, if a triggering condition is detected in at least two of the games, one or more of the players of the active games is awarded a (bonus) award.

In one embodiment, each gaming machine 10 has a single main or base game.

In another embodiment, each gaming machine 10 has at least two main or base games. In this embodiment, the triggering could be required in at least one, two, any number, or all of the games of each gaming machine 10.

In still another embodiment, the progressive controller 10 may also play an instance of the main or base game. The instance of the main or base game played at the progressive controller 10 may not have an associated player. In this embodiment, the instance of the main game played on the progressive controller 10 must result in the triggering condition if the (bonus) award is to be awarded.

In one aspect, the bonus award is awarded to all players of participating gaming machines 10. In another aspect, the bonus award is award only to players playing participating gaming machines 10 in which the main game(s) result in the triggering condition.

Other aspect and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

What is claimed is:

1. A method of allowing a player to play a game the method comprising the steps of:

providing a gaming machine including a unitary display device, a plurality of input devices, a controller connected to the unitary display device and the plurality of input devices, and at least one memory device storing a plurality of gaming machine instructions accessible by the controller, the plurality of input devices including an acceptor device which accepts physical media associated with a monetary value, a validator configured to identify the physical media, and a cash-out button actuatable to cause an initiation of a payout associated with a credit balance;

allowing the player to make a wager via the acceptor device and adjusting the credit balance as a function of the wager;

simultaneously displaying, by the controller, a plurality of video slot games on the unitary display device, each video slot game having a plurality of cells arranged in a predetermined pattern and a plurality of game symbols being displayed in each of the plurality of cells, the plurality of cells being arranged in columns, each video slot game being displayed in a non-overlapping portion of the display;

randomly selecting, by the controller, an outcome associated with each video slot game and simultaneously displaying the outcome of each video slot game on the unitary display device, each video slot game outcome including a game symbol associated with each corresponding cell, the game symbols belonging to a predetermined set of game symbols;

determining if the outcome of each game is a winning outcome and responsively awarding a primary award to the player as a function of each outcome, the wager made by the player, and a predetermined paytable and adjusting the credit balance as a function of the primary award;

detecting a triggering condition including the appearance of a triggering symbol in each outcome of at least two simultaneously displayed video slot games, the triggering condition being defined as the appearance of the triggering symbol in the same column in each of the at least two games;

determining a number of triggering symbols appearing on matching columns in each of the outcomes;

and responsively awarding the player a bonus award upon detecting the triggering condition, the bonus award being a determined as a function of each of the primary awards and the determined number of triggering symbols appearing on matching columns.

2. The method of claim 1, wherein the plurality of games includes first, second, and third games, the bonus award having a first value if the triggering condition occurs in two of the games and having a second value if the triggering condition occurs in three of the games.

3. The method of claim 1, wherein the plurality of games includes first, second, third, and fourth games, the bonus award having a first value if the triggering condition occurs in two of the games, having a second value if the triggering condition occurs in three of the games, and a third value if the triggering condition occurs in four of the games.

4. The method of claim 1, wherein the triggering condition occurs if the outcome of each of the at least two games is a winning outcome.

5. The method of claim 1, wherein the triggering condition occurs if the outcome of each of the at least two games is a losing outcome.

6. The method of claim 1, wherein the triggering condition is independent of a winning outcome in each game.

7. The method of claim 1, wherein the triggering condition is the appearance of a triggering symbol within one of the cells of each video slot game, the bonus award being awarded if the triggering symbol appears in the same cell in each of the at least two games in which the triggering condition occurs.

8. The method of claim 7, a value of the bonus award being a function of the number of triggering symbols occurring in each game.

9. The method of claim 1, wherein the bonus award has a predetermined value.

10. The method of claim 1, wherein the bonus award is a multiplier applied to each of the primary awards.

11. The method of claim 1, wherein the bonus award is a progressive award.

12. A gaming machine playable by a player, comprising:

a unitary display device;

a plurality of input devices including an acceptor device which accepts physical media associated with a monetary value, a validator configured to identify the physical media, and a cash-out button actuatable to cause an initiation of a payout associated with a credit balance;

a game controller; and at least one memory device storing a plurality of gaming machine instructions accessible by the game controller, the game controller configured to:

allow the player to make a wager;

simultaneously display a plurality of games on the unitary display device, each game including a plurality of cells being arranged in a predetermined pattern and a plurality of game symbols being displayed in each of the plurality of cells, the plurality of cells being arranged in columns, each video slot game being displayed in a non-overlapping portion of the display;

randomly select an outcome associated with each game and simultaneously display the outcome of each game on the unitary display device;

determine if the outcome of each game is a winning outcome and responsively award a primary award to the player as a function of each outcome, the wager made by the player, and a predetermined paytable;

detect a triggering condition including the appearance of a triggering symbol in each outcome of at least two simultaneously displayed games, the triggering condition being defined as the appearance of the triggering symbols in the same column in each of the at least two games;

determine a number of triggering symbols appearing on matching columns in each of the outcomes; and award the player a bonus award upon detecting the triggering condition, the bonus award being a determined as a function of each of the primary awards and the determined number of triggering symbols appearing on matching columns.

13. The gaming machine of claim 12, wherein the plurality of games includes first, second, and third games, the bonus award having a first value if the triggering condition occurs in two of the games and having a second value if the triggering condition occurs in three of the games.

14. The gaming machine of claim 12, wherein the plurality of games includes first, second, third, and fourth games, the bonus award having a first value if the triggering condition occurs in two of the games, having a second value if the triggering condition occurs in three of the games, and a third value if the triggering condition occurs in four of the games.

15. The gaming machine of claim 12, wherein the triggering condition occurs if the outcome of each of the at least two games is a winning outcome.

16. The gaming machine of claim 12, wherein the triggering condition is independent of a winning outcome in each game.

17. The gaming of claim 12, wherein the triggering condition occurs if the outcome of each of the at least two games is a losing outcome.

18. The gaming machine of claim 12, wherein the triggering condition is the appearance of a triggering symbol within one of the cells of each video slot game, the bonus award being awarded if the triggering symbol appears in the same cell in each of the at least two games in which the triggering condition occurs.

19. The gaming machine of claim 18, a value of the bonus award being a function of the number of triggering symbols occurring in each game.

20. The gaming machine of claim 12, wherein the bonus award has a predetermined value.

21. The gaming machine of claim 12, wherein the bonus award is a multiplier applied to each the primary awards.

22. The gaming machine of claim 12, wherein the bonus award is a progressive award.

23. A method of allowing a player to play a game the method comprising the steps of:

providing a gaming machine including a unitary display device, a plurality of input devices, a controller connected to the unitary display device and the plurality of input devices, and at least one memory device storing a plurality of gaming machine instructions accessible by the controller, the plurality of input devices including an acceptor device which accepts physical media associated with a monetary value, a validator configured to identify the physical media, and a cash-out button actuatable to cause an initiation of a payout associated with a credit balance;

allowing the player to make a wager via the acceptor device and adjusting the credit balance as a function of the wager;

simultaneously displaying, by the controller, a plurality of games on a unitary display device, the plurality of games being displayed in a predetermined arrangement, each of the plurality of games being displayed in a non-overlapping portion of the display;

randomly selecting, by the controller, an outcome associated with each game and simultaneously displaying the outcome of each game on the unitary display device;

determining if the outcome of each game is a winning outcome and responsively awarding a primary award to the player as a function of each outcome, the wager made by the player, and a predetermined paytable and adjusting the credit balance as a function of the primary award;

and detecting a triggering condition in the outcome of each game of the plurality of games;

identifying each of the plurality of games including the triggering condition;

determining a pattern of games being formed on the display device, the pattern being defined by the position of each of the identified games being displayed on the display device;

and responsively awarding the player a bonus award if the determined pattern of games matches a predetermined pattern of games within the predetermined arrangement.

24. The method of claim 23, wherein the triggering condition occurs if the outcome of the game is a winning outcome.

25. The method of claim 23, wherein the triggering condition occurs if the outcome of the game is a losing outcome.

26. The method of claim 23, wherein the triggering condition is independent of a winning outcome in each game.

27. The method of claim 23, wherein the plurality of games are video slot games, each video slot game having a plurality of cells arranged in a predetermined pattern, each of the first and second outcomes including a game symbol associated with each cell, the game symbols belonging to a predetermined set of game symbols.

28. A gaming machine playable by a player, comprising:

a unitary display device;

a plurality of input devices including an acceptor device which accepts physical media associated with a monetary value, a validator configured to identify the physical media, and a cash-out button actuatable to cause an initiation of a payout associated with a credit balance;

a game controller; and at least one memory device storing a plurality of gaming machine instructions accessible by the game controller, the game controller configured to:

allow the player to make a wager;

simultaneously display a plurality of games on a unitary display device;

randomly select an outcome associated with each game and simultaneously display the outcome of each game on the unitary display device, the plurality of games being displayed in a predetermined arrangement, each of the plurality of games being displayed in a non-overlapping portion of the display;

determine if the outcome of each game is a winning outcome and responsively award a primary award to the player as a function of each outcome, the wager made by the player, and a predetermined paytable;

detect a triggering condition in the outcome of each game of the plurality of games;

identify each of the plurality of games including the triggering condition;

determine a pattern of games being formed on the display device, the pattern being defined by the position of each of the identified games being displayed on the display device; and responsively awarding the player a bonus award if the determined pattern of games matches a predetermined pattern of games within the predetermined arrangement.

29. The gaming machine of claim 28, wherein the triggering condition occurs if the outcome of the game is a winning outcome.

30. The gaming machine of claim 28, wherein the triggering condition occurs if the outcome of the game is a losing outcome.

31. The gaming machine of claim 28, wherein the triggering condition is independent of a winning outcome in each game.

32. The gaming machine of claim 28, wherein the plurality of games are video slot games, each video slot game having a plurality of cells arranged in a predetermined pattern, each of the first and second outcomes including a game symbol associated with each cell, the game symbols belonging to a predetermined set of game symbols.

33. A method of allowing players to play electronic games, the method comprising the steps of:

providing a plurality of gaming machines, each gaming machine offering at least one electronic game, each gaming machine including a display device, a plurality of input devices, a controller connected to the display device and the plurality of input devices, and at least one memory device storing a plurality of gaming machine instructions accessible by the controller, the plurality of input devices including an acceptor device which accepts physical media associated with a monetary value, a validator configured to identify the physical media, and a cash-out button actuatable to cause an initiation of a payout associated with a credit balance;

allowing each player to make a wager via a corresponding gaming machine acceptor device and adjusting the credit balance associated with the corresponding player as a function of the wager;

simultaneously displaying a plurality of games, at least one game being displayed on a display device of each gaming machine, each game including a plurality of cells being arranged in a predetermined pattern and a plurality of game symbols being displayed in each of the plurality of cells, the plurality of cells being arranged in columns;

randomly selecting, by a controller, an outcome associated with each game and simultaneously displaying the outcome of each game on each corresponding gaming machine;

determining if the outcome of each game is a winning outcome and responsively awarding a primary award to a respective player as a function of the outcome and adjusting the credit balance associated with the respective player as a function of the primary award, the wager made by the respective player, and a predetermined pay-table;

and detecting a triggering condition including the appearance of a triggering symbol in each outcome of at least two simultaneously displayed games, each of the at least two games being displayed on different gaming machines, the triggering condition being defined as the appearance of the triggering symbol in the same column in each of the at least two games;

and identifying each gaming machine including the triggering condition and responsively awarding a bonus award to at least one of the players of the gaming machines whose games include the triggering condition.

34. The method of claim 33, wherein each gaming machine provides two electronic games.

35. The method of claim 34, wherein the step of detecting a triggering condition awards the bonus award if both electronic games of at least one of the gaming machines includes the triggering condition.

36. The method of claim 35, wherein the bonus award is award to each of the player(s) of the gaming machine(s) whose games include the triggering condition.

37. The method of claim 33, wherein one of the gaming machines is a progressive controller configured to play an instance of a game without an associated player.

* * * * *